United States Patent [19]
Pommerening

[11] 3,936,604
[45] Feb. 3, 1976

[54] SYNCHRONIZATION OF CLOCKS IN DIGITAL SIGNALLING NETWORKS

[75] Inventor: Uwe A. Pommerening, Webster, N.Y.

[73] Assignee: Stromberg-Carlson Corporation, Rochester, N.Y.

[22] Filed: Feb. 20, 1975

[21] Appl. No.: 551,495

Related U.S. Application Data

[63] Continuation-in-part of Ser. No. 97, Jan. 2, 1970, abandoned.

[52] U.S. Cl............ 178/69.5 R; 179/15 BS; 325/58; 328/133
[51] Int. Cl.²............................................ H04L 7/00
[58] Field of Search............ 178/69.5 R; 179/15 BS; 325/58, 63, 303; 328/63; 343/179

[56] References Cited
UNITED STATES PATENTS 3,457,372   7/1969   Karnaugh.................... 179/15 BS
3,467,779   9/1969   Duerdoth..................... 179/15 BS

*Primary Examiner*—George H. Libman
*Attorney, Agent, or Firm*—William F. Porter, Jr.; Hoffman Stone

[57] ABSTRACT

In a digital signalling network of the kind in which only data pulses are transmitted among the different stations, and more than one of the stations includes means for producing clock signals, synchronization of the network is achieved by producing at each station, in response to received data pulses, derived clock signals at the same rates as the clock signals produced at each of the other stations. Each station scans all available clock signals, its own and all those derived from the incoming data signals, compares the scanned signals one by one with its own operating rate, and adjusts the rate to conform to the slowest signal. The signals of concern are time-spaced electrical pulses, and rate comparison is accomplished by counting.

3 Claims, 6 Drawing Figures

FIG. 1
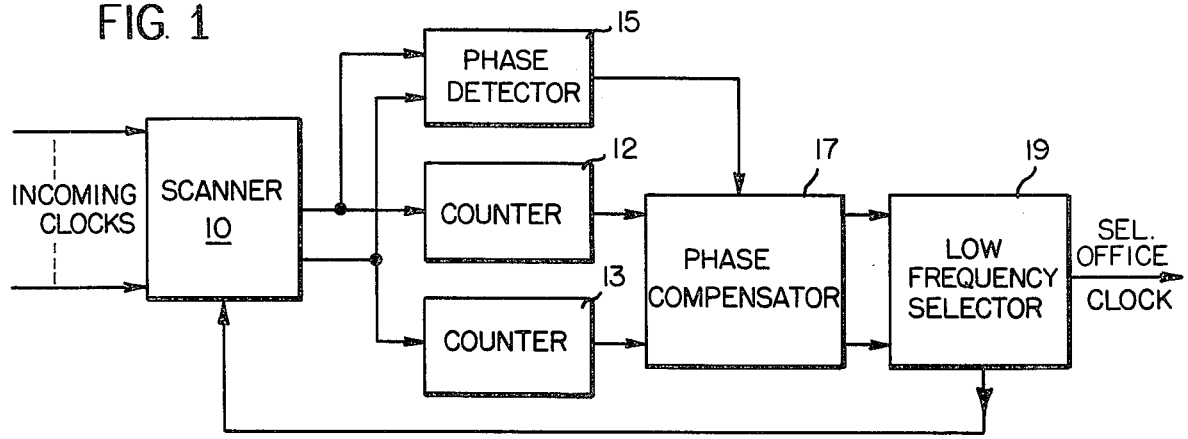
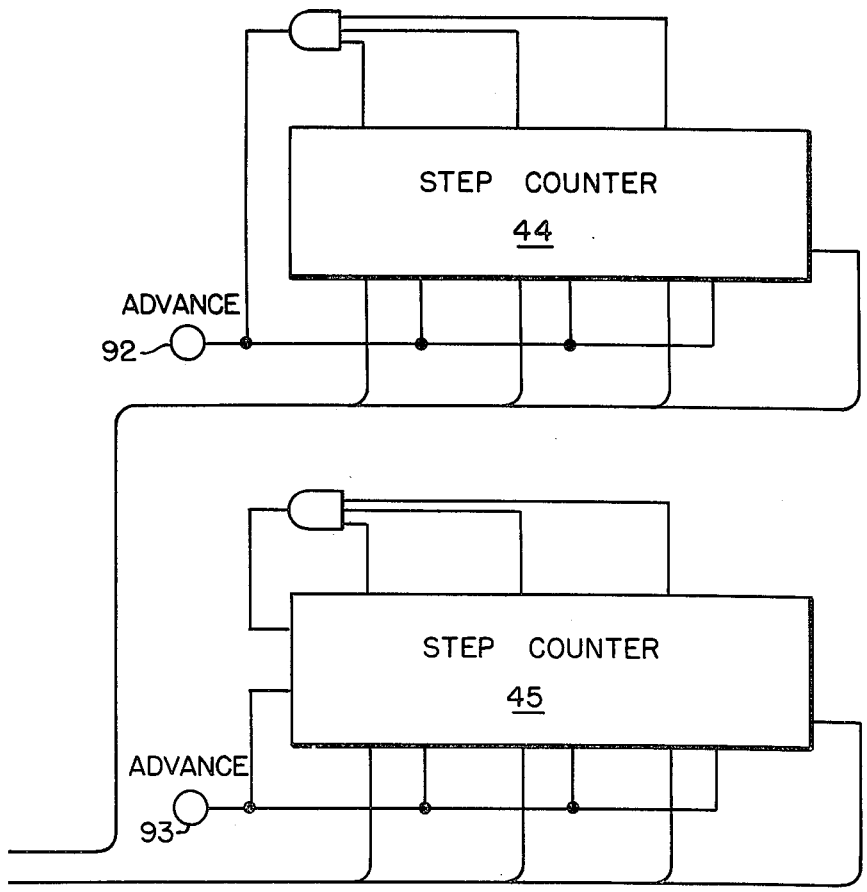
FIG. 2B
INVENTOR.
UWE A. POMMERENING
BY
ATTORNEY

INVENTOR.
UWE A. POMMERENING
BY

ATTORNEY

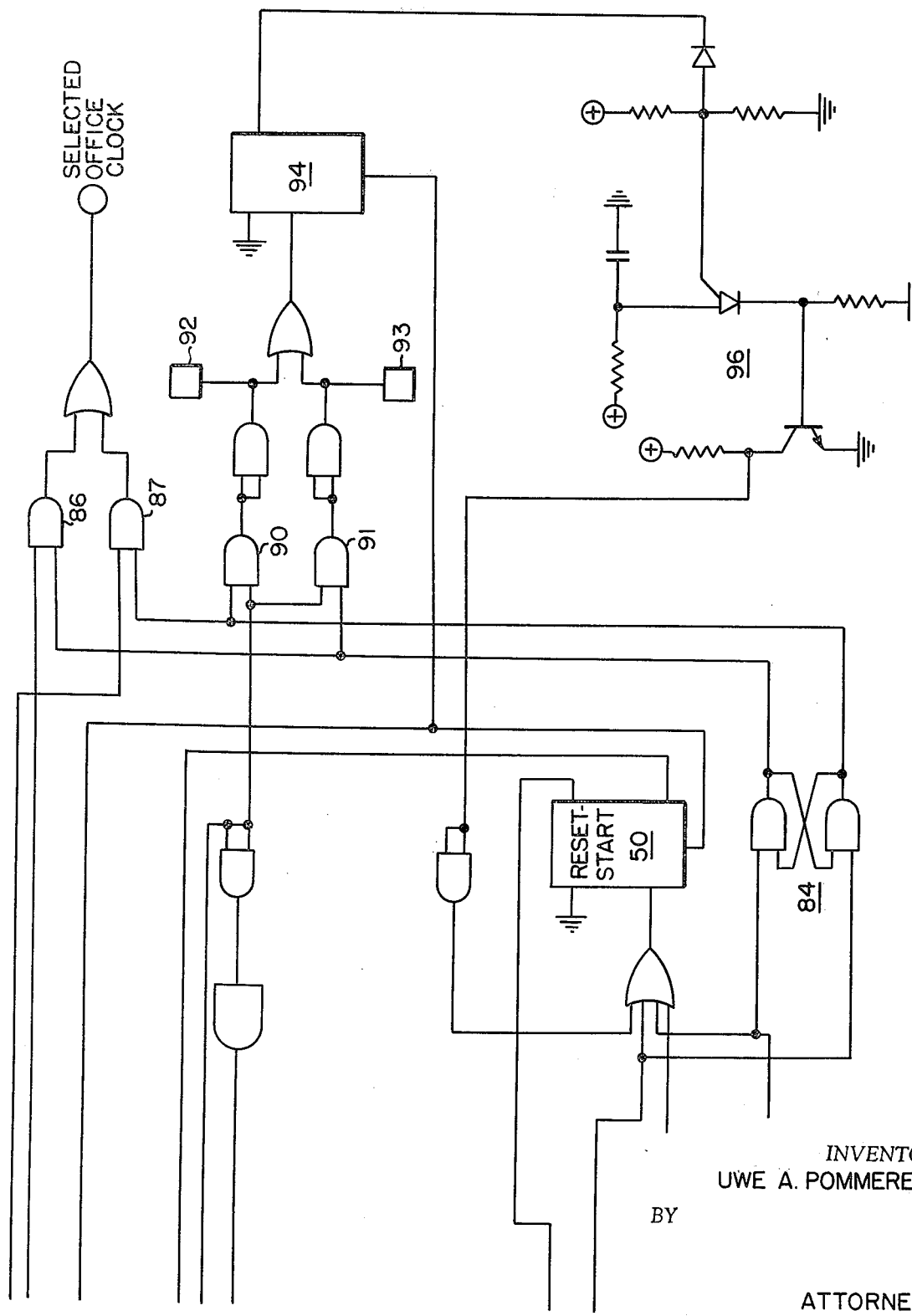

SYNCHRONIZATION OF CLOCKS IN DIGITAL SIGNALLING NETWORKS

BRIEF DESCRIPTION

This application is a continuation-in-part of my co-pending application Ser. No. 97, filed Jan. 2, 1970, and abandoned, and bearing the same title as this application.

This invention relates to synchronization of digital signalling networks, and more especially, but not exclusively, to synchronization of pulse-code modulated signalling systems of the kind used in the telephone industry.

Synchronization between two offices in a pulse code modulated signalling link may be very simply accomplished by designating one of the offices a slave and having it synchronize its operations in accordance with signals received from the other office called the master. The situation becomes much more complex, however, when more offices are added to form a network, as occurs in extensive telephone systems. One previous proposal was to use a single clock located at an office designated the master, and to make all other offices slaves. This is feasible, except for practical problems of reliability. If a fault occurs, a portion of the network may lose its clock signal and be out of service until the fault is corrected.

Since loss of service is not to be tolerated, it is generally preferred to provide a clock at each office. The problem then arises of compensating for differences between the rates at which the different clocks run, or of developing clocks that run at exactly the same rates. The requirement has been set in the telephone industry, that pulse-code modulated signalling systems should be capable of running for 24 hours without loss of information. One solution heretofore suggested was to use expensive so-called nuclear clocks. Another is to use cheaper, slightly less accurate clocks, and to provide signal storage capacity at each office to accommodate the differences in clock rates. If an incoming signal is timed at a slower rate than the local clock, the resulting data error has simply been accepted as beyond remedy, and previous efforts have been aimed at compensating for cases where the incoming signal is timed at a faster rate than the local clock. This has been done by storing the incoming data until the local office is ready to accept it in its proper sequence.

Since data stores and the circuitry required to operate them add to the cost of the office equipment, efforts have been directed toward minimizing the amount of storage capacity needed for adequate compensation. One previous suggestion taught in U.S. Pat. No. 3,453,594 was to have each office monitor all of the signals reaching it and adjust its own clock toward a rate that would minimize storage utilization. The present invention is directed toward this problem of minimizing storage requirements in pulse code modulated signalling networks in which each office includes means for independently generating a clock signal, and in which clock synchronization must be derived from the transmitted data signals.

Briefly, the invention in its broadest aspect lies in the realization that if each office in the PCM network is arranged to time itself according to the slowest clock signal available to it, the entire network will always follow the slowest clock in the network and will arrive at full synchronization within the time required for the last office to find the slowest clock. This time is relatively short — a matter of a few seconds or minutes in the usual case — and calculations have shown that no storage capacity is required at the offices in addition to the storage normally used in any case in connection with encoding and channel assignment.

Selection of the slowest, rather than the fastest, clock enables operation without loss of data, and without data error except during the brief periods required to achieve synchronization. Data may be stored for later use if it enters the office faster than the office clock as the network adjusts itself to any change, but if the data arrives at a slower rate, data error occurs for which there is no way to compensate. It is, therefore, preferred to synchronize on the slowest clock, not the fastest.

DETAILED DESCRIPTION:

Figure 2A:
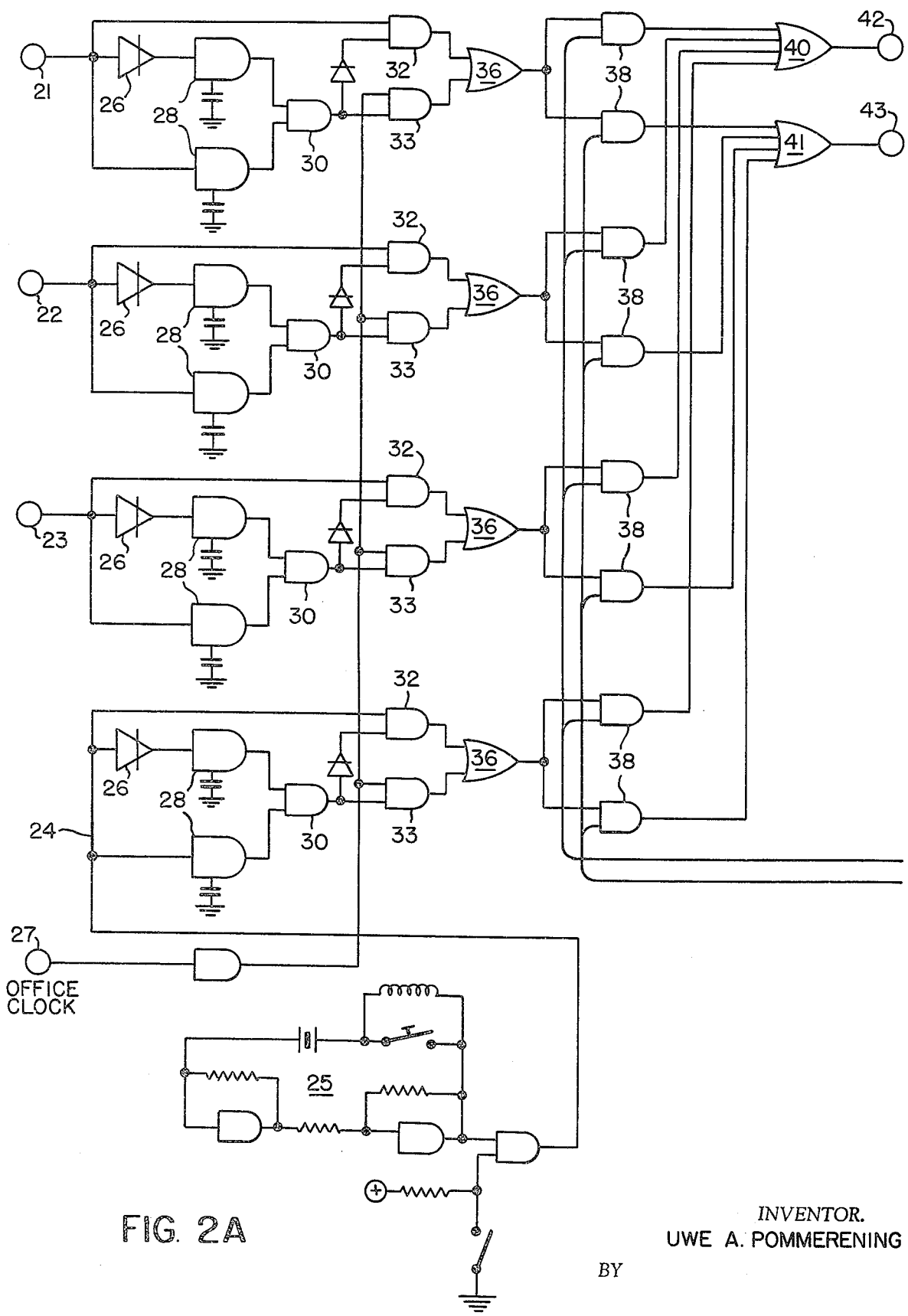
Figure 3A:
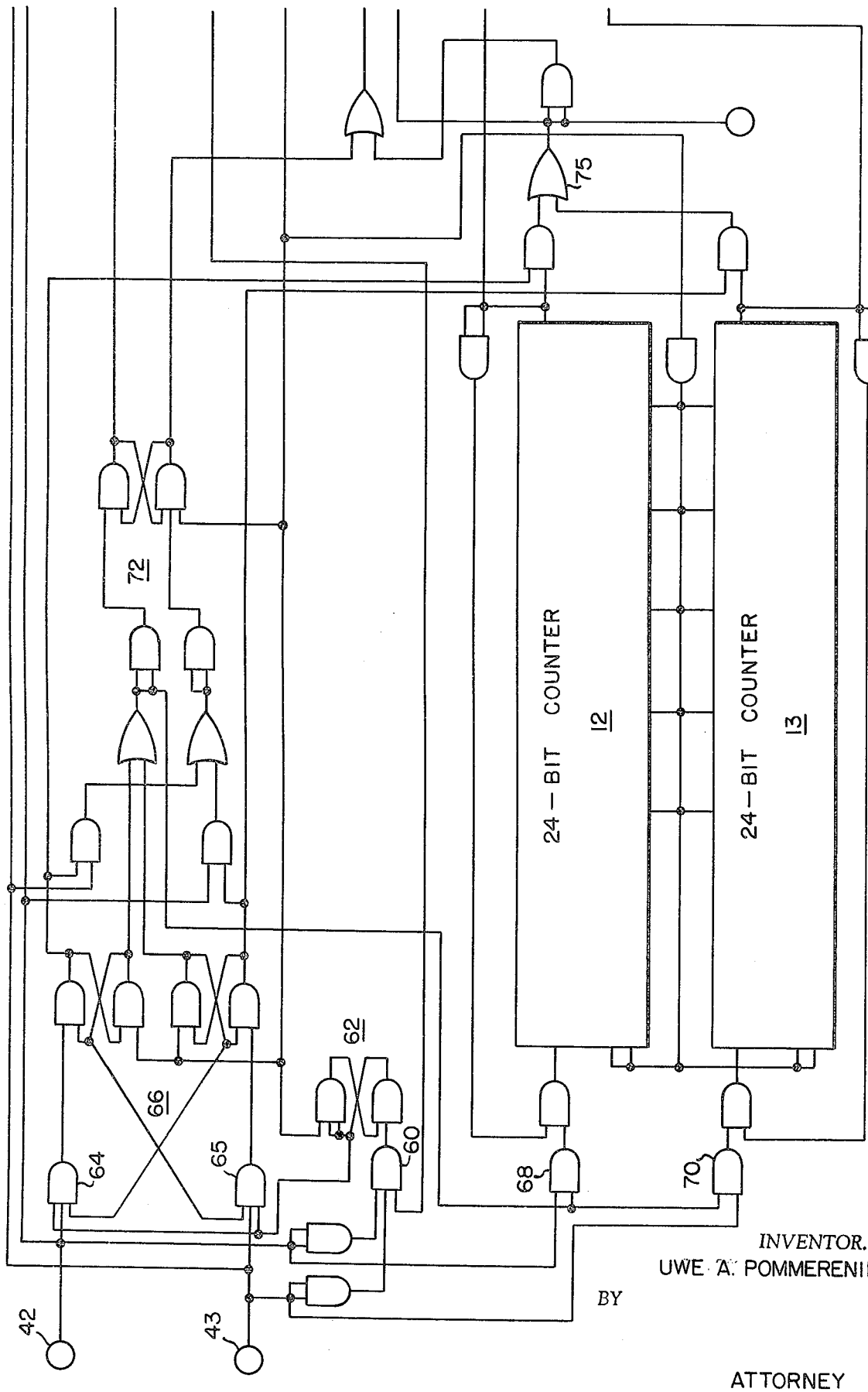
Figure 3B:
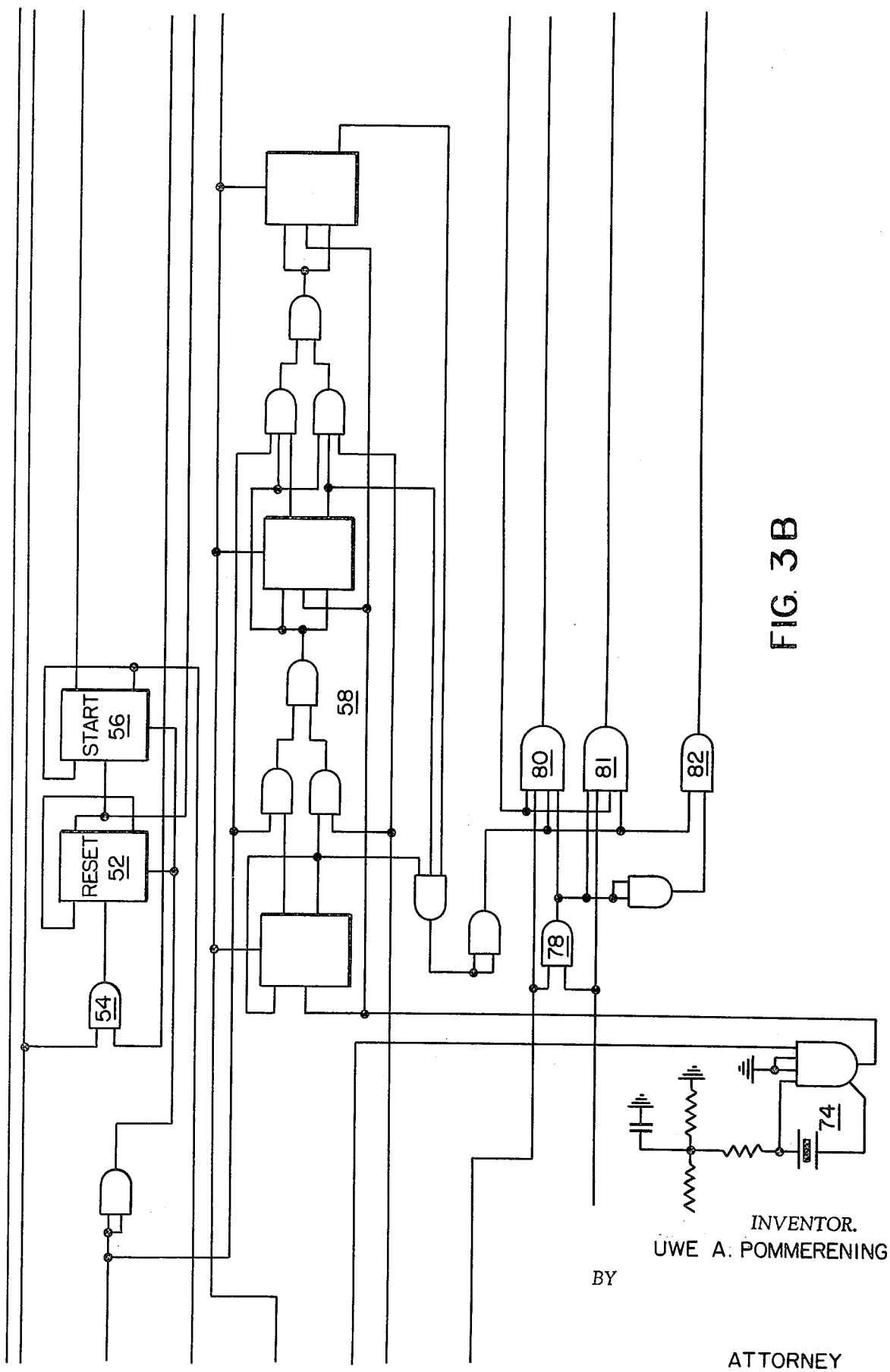

A representative embodiment of the invention will now be described in conjunction with the accompanying drawings, wherein:

FIG. 1 is a block diagram of a synchronization circuit according to the invention;

FIGS. 2A and 2B taken in juxtaposition with FIG. 2A to the left of FIG. 2B constitute a schematic diagram of a scanner arranged for use in a synchronization circuit according to the invention; and FIGS. 3A, 3B, and 3C juxtaposed with FIG. 3A to the left and FIG. 3C to the right are a schematic diagram of a frequency discriminator and associated logic arranged for use in the synchronization circuit of the invention.

Referring first to FIG. 1, the circuit according to the embodiment of the invention illustrated herein includes a scanner 10, followed by a pair of counters 12 and 13, a phase detector 15, a phase compensator 17, and a low frequency selector 19.

Clock signals denoted herein as the incoming clocks are derived by any desired means (not shown) from data signals appearing on all of the lines coming into the local office. The incoming clock signals are at the same respective rates as the clock signals produced at the transmitters of the other offices in the network that are connected to the local office.

All of the clock signals available at the local office, including the output of its own clock, appear at separate respective input terminals of the scanner 10. The scanner 10 is selectively stepped to feed two clock signals to the counters 12 and 13. The counters 12 and 13 are arranged to count enough clock pulses to insure reliable selection of the lower rate. The number of pulses counted is preferably one or two orders of magnitude more than the reciprocal of the established accuracy of the clocks in the network.

The phase detector 15 and compensator 17 allow for differences in phase between the respective clock signals counted by the counters 12 and 13. The low frequency selector 19 is a toggle arrangement that directs the slower rate clock signal to a terminal designated the office clock for timing the operation of the local office. It also controls operation of the scanner 10, causing it to continue to feed the selected slower clock signal to one counter, and to switch from the faster, rejected signal to another one for the other counter at the end of each count. In this way, all of the clock signals appearing at the local office are compared, one by one, with the clock actually timing the local office, and if any clock signal is found to be slower, it then is selected as the office clock.

A detailed circuit diagram of an actual scanner circuit, including certain fail-safe features, which has provided satisfactory operation in the practice of the invention is shown in FIGS. 2A and 2B arranged for scanning three incoming clock signals and a locally generated clock signal. The incoming clock signals are applied at input terminals 21, 22, and 23, and the local clock signal generated by the oscillator 25 appears at the terminal 24. The clock signals are fed through arrays of gates 32 to respective OR gates 36. The signal selected as the office clock appears at a separate input terminal 27, and is fed to one input of each of another array of gates 33, which are arranged individually paralleling the gates 32 immediately before the OR gates 36. The clock signals are also fed respectively to the inputs of supplemental gates 28, which are arranged in pairs and connected as integrators, with capacitors (not separately designated) connected between their node terminals and ground so that they are all held constantly in the same condition so long as the clock signals are present at the terminals 21-24. Thus, the supplemental gates 28 normally inhibit the auxiliary gates 33 and partially enable the gates 32 to feed the clock signals to the OR gates 36. If one of the clock signals fails, or is interrupted for any reason, one gate of the pair of supplemental gates 28 to which it is applied becomes unmarked, one or the other of the pair depending on the condition created at the inputs of the gates by the failure of the clock. Unmarking of one of the gates 28 inhibits the following gate 32 through the gates 30 and invertors 31, and partially enables the corresponding auxiliary gate 33.

The clock signal selected as the office clock is applied to the auxiliary gates 33, and thus substitutes for any of the scanned clock signals in the event of failure. If the clock signal designated as the office clock fails, the circuit operates to synchronize on the clock signal currently being compared with it, and a new slowest clock is again selected to be designated as the office clock.

The number of clock signals shown illustratively is four. It will be realized, however, that it is a simple matter of repeating the circuitry to provide for as many network clock signals as desired.

The clock signals at the outputs of the OR gates 36 are selected by gates 38, controlled by step counters 44 and 45, and selectively fed to respective output OR gates 40 and 41. The selected clock signals appear at terminals 42 and 43 for application to the counters 12 and 13 shown in FIG. 3A. One of the two clock signals is the slowest one so far found by the selector circuit. The other clock signal is any one selected by stepping of one of the step counters 44 and 45, which control the selecting gates 38.

The outputs of the OR gates 40 and 41 are fed through the terminals 42 and 43 to respective binary counters 12 and 13 (FIG. 3A) which are preferably arranged to count to a sum about one or two magnitudes larger than the reciprocal of the design accuracy of the clocks of the network. In the case of conventional pulse code modulated signalling systems using crystal controlled, ovenmounted clocks, at 1.544 mega hz., 24-bit counters have been found to be satisfactory.

It is desired to start counting at a predetermined point in the clock signal cycle and to compensate for phase differences between the two clock signals, because the difference in rate is normally expected to amount to less than a full cycle over the counting period. The circuit is prepared to start the count by operation of the RESET and START flip-flop 50 (FIG. 3C) which is triggered upon completion of the preceeding count. The RESET and START flip-flop 50 triggers the RESET flip-flop 52 through a gate 54 in coincidence with a clock pulse appearing at the terminal 42. The RESET flip-flop 52 resets the counters 12 and 13, an up/down counter 58, and various other flip-flops in the circuit. Setting of the RESET flip-flop 52 also sets the START flip-flop 56, partially to enable a gate 60 (FIG. 3A) the output of which triggers a guard flip-flop 62 during an interval controlled by the clock signals at the terminals 42 and 43 to allow the next-to-occur clock pulse to start the count. The guard flip-flop 62 partially enables gates 64 and 65 to which the terminals 42 and 43 are also connected. When the next clock pulse occurs, it passes through one of the gates 64 and 65 and triggers a toggle flip-flop arrangement 66, which inhibits the other one of the gates 64 and 65, and enables gates 68 and 70 at the inputs of the respective counters 12 and 13.

The output of the toggle flip-flop arrangement 66 is also used to trigger a PHASE START flip-flop 72 to start the phase oscillator 74 (FIG. 3B) and to bias the up/down counter 58 for counting up the output of the phase oscillator. The phase oscillator 74 is set to operate at at least about eight to ten times the frequency of the network clocks, and faster if more precise rate discrimination is desired. The up/down counter 58 counts until the occurrence of the next pulse at the other one of the input terminals 42 and 43, that is, the first pulse to be counted of the clock signal that is later in phase than the clock signal first counted. This pulse sets the toggle flip-flop arrangement 66 to its third condition, keeping the gates 68 and 70 partially enabled, but re-setting the PHASE-START flip-flop 72 to stop the oscillator 74. The up/down counter 58 then stores the count indicating the phase difference between the clock signals being compared until completion of the first count by the counters 12 and 13.

The outputs of the counters 12 and 13 are OR'ed through a gate 75 (FIG. 3A) to re-start the phase oscillator 74 and to bias the up/down counter 58 to count down. Selection of the office clock is made by selecting the last to occur of two events: reaching zero by the up/down counter 58, and completion of its count by the last to finish of the counters 12 and 13.

If these two events occur simultaneously, a gate 78 (FIG. 3B) is enabled to inhibit the selector input gates 80 and 81 and to enable an equal count gate 82. Inhibiting the selector input gates 80 and 81 prevents triggering of the selector flip-flop 84 (FIG. 3C) and keeps the local office timed by the same clock signal as at the start of the comparison.

If the two events are not simultaneous, the first to occur causes one of the selector input gates 80 and 81 to set the selector flip-flop 84 to enable the one of output gates 86 and 87 that also receives the slower clock signal.

The outputs of the selector input gates 80 and 81 and of the equal count gate 82 are OR'ed to trigger the START & RESET flip-flop 50 to prepare the circuit for the next comparison. The reset signal is also fed through one of a pair of ADVANCE gates 90 and 91 to its output terminal 92 or 93, in accordance with the condition of the selector flip-flop 84 to advance one of the step counters 44 and 45 (FIG. 2B) to select the next clock signal for comparison with the one designated the office clock. The advance signal is also used to set a safety flip-flop 94 to start an emergency timer 96 (FIG. 3C) which re-starts the entire operation if a re-set signal is not produced within a time slightly longer than the interval normally required.

What is claimed is:

1. Method of synchronizing a signalling network of the pulse code modulated type having a plurality of local offices more than one of which has an independent clock for producing clock signals to time its operation comprising synchronizing all the local offices in accordance with the slowest clock in the network.

2. A pulse code modulated signalling system comprising:

a. a plurality of local offices, more than one of said offices having means for producing clock signals independently of all others of said local offices,
b. means for transmitting clock signals among said offices, and
c. means at each of said offices that has means for producing clock signals for selecting the slowest clock signal to appear at it and to time its operation in accordance with the selected slowest clock signal.

3. A signalling system according to claim 2, wherein said transmitting means includes means for transmitting erratically spaced data pulses among the offices, and means at each office having clock means for deriving in response to data signals received from the other offices clock signals at the same respective rates as the clock signals that time operation of the other offices.

* * * * *